United States Patent
Yamada et al.

[11] Patent Number: 5,102,647
[45] Date of Patent: Apr. 7, 1992

[54] METHOD OF PRODUCING VAPOR GROWTH CARBON FIBERS

[75] Inventors: Hirokazu Yamada; Yukio Fukuyama, both of Oita, Japan

[73] Assignee: Showa Denko K.K., Tokyo, Japan

[21] Appl. No.: 630,756

[22] Filed: Dec. 21, 1990

Related U.S. Application Data

[63] Continuation of Ser. No. 337,208, Apr. 12, 1989, abandoned.

[30] Foreign Application Priority Data

Apr. 12, 1988 [JP] Japan .................. 63-88113

[51] Int. Cl.⁵ .............................................. C01B 31/02
[52] U.S. Cl. .................................... 423/447.3; 423/449; 423/453; 423/454; 423/458; 423/DIG. 16
[58] Field of Search ............ 423/445, 447.3, 447.1, 423/449, 453, 454, 458, DIG. 16

[56] References Cited

U.S. PATENT DOCUMENTS

| | | | |
|---|---|---|---|
| 2,846,370 | 8/1958 | Halik et al. | 423/454 |
| 3,459,655 | 8/1969 | Kimberlin et al. | 423/454 |
| 3,490,870 | 1/1970 | De Land | 423/450 |
| 3,867,513 | 2/1975 | Krejci | 423/449 |
| 4,394,350 | 7/1983 | Cheng | 422/750 |
| 4,435,376 | 3/1984 | Porter et al. | 423/447.3 |
| 4,518,575 | 5/1985 | Porter et al. | 423/453 |
| 4,565,683 | 1/1986 | Yates et al. | 423/447.3 |
| 4,572,813 | 2/1986 | Arakawa | 423/447.3 |
| 4,650,657 | 3/1987 | Brooks | 423/447.3 |
| 4,767,737 | 8/1988 | Brooks | 423/447.3 |

FOREIGN PATENT DOCUMENTS

| | | | |
|---|---|---|---|
| 1175616 | 10/1984 | Canada | 423/447.3 |
| 54-6891 | 1/1979 | Japan | 423/453 |
| 56-118913 | 9/1981 | Japan | 423/447.3 |
| 57-117622 | 7/1982 | Japan | 423/449 |
| 58-22571 | 5/1983 | Japan | 423/449 |
| 58-110493 | 7/1983 | Japan | 423/458 |
| 59-223299 | 12/1984 | Japan | 423/449 |
| 60-181319 | 9/1985 | Japan | 423/449 |
| 62-242 | 1/1987 | Japan | 423/447.3 |

OTHER PUBLICATIONS

R. Echigo, S. Hasegawa et al., Int. J. Heat Mass Transfer, vol. 15, 1972, pp. 2595–2610.

*Primary Examiner*—Robert Kunemund
*Attorney, Agent, or Firm*—Sughrue, Mion, Zinn, Macpeak & Seas

[57] ABSTRACT

A method of producing vapor growth carbon fibers which are grown in a rection space by thermally decomposing gaseous hydrocarbon and by using transition metal fine particles as the catalyst, wherein the reaction space is filled with ceramic granules which serve as a radiation heat transfer medium and are moved to prevent an intermingling of the growing carbon fibers, so that the grown carbon fibers are conveyed from the reaction space by a gas stream.

9 Claims, 2 Drawing Sheets

METHOD OF PRODUCING VAPOR GROWTH CARBON FIBERS

This is a continuation of application Ser. No. 07/337,208 filed Apr. 12, 1989, now abandoned.

BACKGROUND OF THE INVENTION

1. Field of the Invention

The present invention relates to carbon fibers, and more particularly, to a method of producing short carbon fibers by a vapor phase growth process (hereinafter referred to as vapor growth carbon fibers).

2. Description of the Related Art

Carbon fibers have been produced by preparing PAN (polyacrylonitrile) fibers, pitch fibers or the like as a precursor and stabilizing and graphitizing the fibers, and have been used in composite products of the aerospace industry, sports goods industry, leisure goods industry and the like, because these carbon fibers have superior properties such as a light weight, high tensile strength and high modulus. If the carbon fibers can be produced at a cost lower than currently required, it is expected that these carbon fibers will be widely used in the automobile industry and in general industry or the like. Although vapor growth carbon fibers are discontinuous fibers (short fibers), the fibers are directly formed by thermally decomposing gaseous hydrocarbons, such as benzene and methane, and utilizing a catalyst of transition metal fine particles, so that the production cost thereof can be greatly reduced compared with that of the above mentioned carbon fibers, and the produced fibers will have superior physical and chemical properties.

Conventional methods of producing vapor growth carbon fibers are classified, from a standpoint of the existing state of transition metal particle catalysts, into (a) a substrate seed method using a substrate carrying the catalyst thereon (cf. Japanese Examined Patent Publication (Kokoku) No. 58-22571 and Japanese Unexamined Patent Publication (Kokai) No. 57-117622) and (b) a space seed method in which the catalyst is directly fed into a reaction space (cf. Japanese Examined Patent Publication No. 62-242). In the substrate seed method a sufficient residence time can be allowed to obtain grown fibers having a diameter of several micrometers, but this method has a low utilization of the reaction space due to the use of the substrate, which is a weak point for use thereof on an industrial scale. The space seed method provides an increased utilization of the reaction space by using the reaction space three-dimensionally, but has the following problems from the aspect of the use thereof on an industrial scale.

A. The generation and growth of the vapor growth carbon fibers requires a large amount of heat for preheating a carrier gas and gases used, preheating and thermally discomposing hydrocarbon, and maintaining a reaction (growing) temperature, and thus a large amount of heat must be fed to the reaction space from outside. Although a feed density of heat to the space is increased, a convection heat transfer from a wall of a reaction tube can not provide a sufficiently heat flux, but the production of the vapor growth carbon fibers depends upon the efficiency of the convection heat transfer. At a vapor growth temperature of from 950° to 1300° C., a radiation heat transfer is more effective than a convection heat transfer, but a carrier gas such as hydrogen and argon and a raw material (hydrocarbon) gas such as benzene and methane used for the vapor growth of the carbon fibers are almost transparent to the radiation, and thus the radiation heat transfer from the wall of the reaction tube has little effect.

B. The carbon fibers grow in random directions in the reaction space, with the result that the fibers are intermingled or aggregated to form flossy masses having a very low bulk density. These flossy masses (products) come in various sizes, and therefore, have different resistances to gas flow transportation. Furthermore, some of these flossy masses adhere to the wall of the reactor tube, due to carbon fibers growing out of the wall, and thus these adhered flossy masses have a large resistance to the gas flow transportation. As the result, the differences of the resistances of the flossy products to the gas flow transportation does not allow a practical control of the residence time (growing time) of the carbon fibers, which prevents the use of remarkably profitable features in industrial production using a space seed method, such as a continuous feed of a gaseous raw material and a continuous discharge of vapor growth carbon fibers by the gas flow transportation. Accordingly reaction control is greatly hindered, and thus improvements to the reactor and/or operation thereof are required.

C. The above-mentioned flossy masses (products) are hard to handle during the following steps of transportation, storage, composition with resin or the like, and thus it is necessary to decompose or take each of the flossy products apart.

An improved substrate seed method has been proposed in which narrow and long small substrates are prepared and are set in the reaction tube, to increase the utilization of the reaction space (cf. Japanese Unexamined Patent Publication No. 59-223299). This proposed method is advantageous in that the space utilization is increased and a continuity of the substrate seed method is obtained, but it is still necessary to insert to and take out the substrates from the reaction tube, to feed raw materials, and to discharge the products (vapor growth carbon fibers).

SUMMARY OF THE INVENTION

An object of the present invention is to provide a method of continuously producing vapor growth carbon fibers without the above-mentioned problems.

Another object of the present invention is to improve the space seed method to increase the productivity (yield), make the reaction control easier and produce the carbon fibers in a state in which they are easily handled in the following steps.

These and other objects of the present invention are achieved by a method of producing vapor growth carbon fibers which are grown in a reaction space by thermally decomposing gaseous hydrocarbon and by using transition metal fine particles as a catalyst, characterized in that the reaction space is filled with ceramic granules which serve as a radiation heat transfer medium and are moved to prevent an intermingling of the growing carbon fibers, so that the grown carbon fibers can be conveyed from the reaction space by a gas stream.

A reaction (growing) temperature of the vapor growth carbon fibers is from 950° to 1300° C., as generally adopted in conventional producing methods.

The hydrocarbon of a source of carbon is at least one of organic chain or cyclic compounds, such as benzene, toluene, methane, ethane, propane, butane, ethylene, propylene, and butene. These compounds are saturated compounds or unsaturated compounds. It is possible to use heterocompounds comprising hydrocarbon and at least one element among nitrogen, oxygen, fluorine, phosphorus, sulfur, chlorine, bromine and the like. In particular, hetero compounds containing sulfur, such as thiophene and benzothiophene increase the yield rate, and heterocompounds containing oxygen, such as aldehydes and alcohol contribute to a repression of the generation of soot-like materials. Further, it is possible to use a mixture of at least two of the above-mentioned compounds.

A hydrogen gas is used as a carrier gas, and it is possible to add an inert gas, such as a rare gas of argon or helium and a nitrogen gas to the hydrogen carrier gas. In this case, the volume percentage of the added gas is preferably less than 50 vol % of the mixed carrier gas.

To form the transition metal fine particle catalyst, transition metal compounds or organic transition metal compounds of transition metals, in particular, Group VIII metals of the periodic table, are used as a precursor for the catalyst. These transition metals include vanadium, niobium, tantalum, chromium, molybdenum, tungsten, manganese, technetium, phenium, iron, ruthenium, osmium, cobalt, rhodium, iridium, niobium, palladium or the like. The precursor compounds can be gasificated and/or dissolved into a suitable solvent. Representative examples of the transition metal compounds are iron nitrate and ferrous sulfate, and representative examples of the organic transition metal compounds are alkylmetals; metallocene (e.g., ferrocen) of a complex including a $\pi$ (pi)-electron bond; and carbonyl compounds (e.g., iron carbonyl). It is possible to use a mixture of the above-mentioned compounds. The precursor of the transition metal compounds or organic transition metal compounds are fed into the reaction space (reaction tube) in a manner such that (a) the precursor is dissolved in the hydrocarbon of the carbon source, (b) the precursor is dissolved in a suitable solvent, and (c) the precursor is evaporated and converted to a gaseous state and flows with or without a carrier gas.

According to the present invention, the ceramic granules charged into the reaction space of a region for growing carbon fibers should be made to move within a reaction tube (vessel), to increase a radiation heat transfer effect of the granules, prevent an intermingling of growing carbon fibers, and contribute to the gas flow conveyance of the growing and grown carbon fibers in and from the reaction space. The ceramic granules are moved so as to form (a) a fluidized bed, (b) a moving bed, or (c) a rotary bed, by using a rotary reactor vessel. In the fluidized bed system, the gases (carrier gas, hydrogen gas and additive gases) fed through a perforated plate of a reaction tube, and the decomposition product gases, form a gas flow which fluidizes the ceramic granules within the reaction space. In the moving bed system, the ceramic granules are circulatingly moved and the bed gases come into contact with the ceramic granules in a counter-current flow movement in the reactor tube. The ceramic granules are taken out of and returned to the reactor tube by a suitable device. In the rotary bed system, the ceramic granules are moved (fluidized) by a mechanical friction force from the inside surface of the rotating reactor tube and the force of the gravity. A typical example of the rotary bed system apparatus is a rotary kiln.

Preferably, the ceramic granules are made of mullite, alumina, zirconia and the like. Also preferably, the ceramic granules have a roundish shape to prevent wear thereof due to contact therebetween occurring in the fluidized bed or rotary bed.

The maximum size of the ceramic granules is determined, in the case of a fluidized bed, by a fluidization capability, and the minimum size is determined by the ease of separation of the vapor growth carbon fibers from small ceramic granules. Preferably, the ceramic granules have an average particle diameter of from 10 to 0.01 mm, in particular, from 5 to 0.05 mm. In the case of a rotary bed, there is no limit to the maximum size of the granules, as long as the granules can be moved by rotation of the reactor tube. The minimum size is determined by the ease of separation of the grown fibers from small ceramic granules. Preferably, the ceramic granules have an average particle diameter of from 100 to 0.01 mm, more preferably, 10 to 0.05 mm.

According to the present invention, since the ceramic granules of the radiation heat transfer medium fill the reaction space, at a vapor growth temperature of from 950° to 1300° C., the radiation heat transfer can be effectively utilized to heat the fed gases, compared with the convection heat transfer. This has been proved by experiments by the present inventors and is supported by the technical report authorized by R. Echigo, S. Hasegawa and H. Tamehiro: Int. J. Heat Mass Transfer, Vol. 15, 1972, pp. 2595-2610.

BRIEF DESCRIPTION OF THE DRAWINGS

The present invention will be more apparent from the description of the preferred embodiments set forth below, with reference to the accompanying drawings, in which.

DESCRIPTION OF THE PREFERRED EMBODIMENTS

Figure 1:
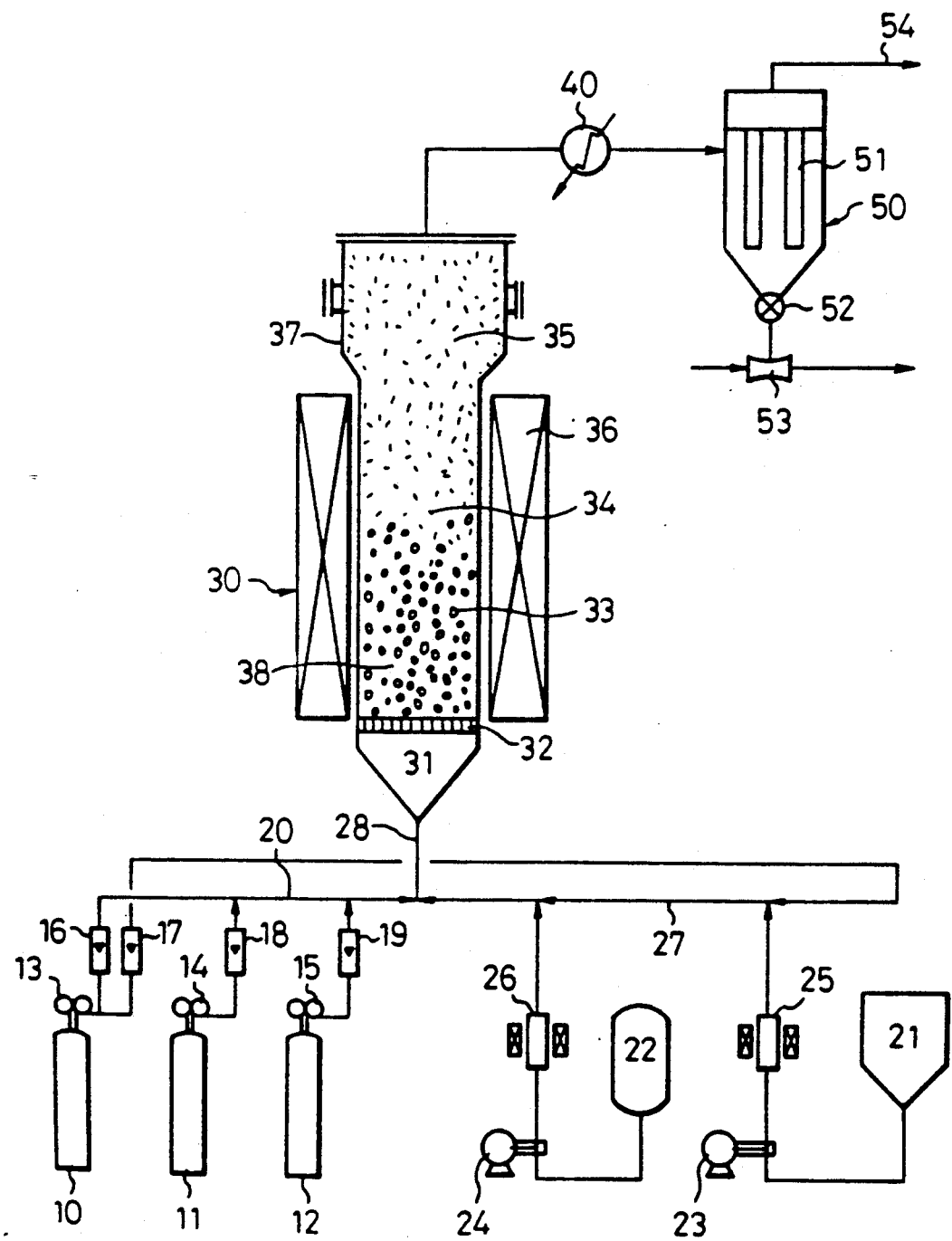
FIG. 1 is a schematic view of an apparatus for producing vapor growth carbon fibers, including a fluidized bed type reactor.

Referring to FIG. 1, an apparatus for producing vapor growth carbon fibers in accordance with the method of the present invention includes a fluidized bed type reactor 30. The apparatus is provided with a hydrogen gas cylinder 10, a hydrogen sulfide gas cylinder 11, and a carbon dioxide gas cylinder 12. The hydrogen gas is used as a carrier gas, and the hydrogen sulfide gas and carbon dioxide gas are used for controlling the shape and structure of the vapor growth carbon fibers. These gases are fed into the reactor 30 through a manifold 20 and an inlet pipe 28 while the pressures thereof are controlled by pressure controllers 13, 14 and 15 and the blow rates thereof are controlled by flow meters 16, 18 and 19. The apparatus is also provided with a vessel 21 for containing a liquid hydrogen carbon, such as benzene. The liquid hydrogen carbon is fed by a fixed displacement pump 23 in a predetermined quantity and at an increased pressure to a vaporizer 25, in which it is gasificated, and the gasificated hydrogen carbon then made to flow into another manifold 27. Where a gaseous hydrogen carbon such as methane gas is used instead of the liquid hydrogen carbon, a methane gas cylinder with a pressure controller and a flow meter is provided instead of the vessel 21 with the pump 23 and vaporizer 25. The apparatus also has another vessel 22 containing a liquid solvent, such as benzene, into which transition metal compounds and/or organic transition metal compounds are dissolved, as a liquid precursor of the transition metal particle catalyst. The liquid solvent (precursor) is fed by a fixed displacement pump 24 at a predetermined quantity and at an increased pressure to a vaporizer 26 in which it is gasificated, and then the gasificated solvent including the transition metal compounds is made to flow into the manifold 27. The gasificated hydrogen carbon and the gasificated solvent are fed into the reactor 30 through the inlet pipe 28 together with a hydrogen gas flowing from the hydrogen gas cylinder 10 through the pressure controller 13 and the flow meter 17 into the manifold 27, as shown in FIG. 1. Where a sublimatable organic transition metal compound such as ferrocen is used as a catalyst precursor, the organic transition metal compound gas gasified by sublimination is fed into the manifold 27 without dissolving same into a solvent. In this case, the vessel 22 contains the sublimatable compound, and is provided with a pressure controller and a flow meter instead of the pump 24 and vaporizer 26. In the apparatus of FIG. 1, the inlet pipe 28 collects all the gases from the manifolds 20 and 27. It is possible, however, to feed independently each of the gases into the reactor 30. Furthermore, it is possible to feed the liquid hydrocarbon and the liquid catalyst precursor directly into the reactor, so that they are gasificated within the reactor.

The fluidized bed type reactor 30 comprises a reactor body (tube) 37 having an inlet region 31, a reaction region (space) 38, and a sedimentation (settling) region 35; a heating means (heater) 36; and a dispersion plate (perforated plate) 32 placed in the reactor body 37. Ceramic granules 33 are charged in the reactor body 37 to fill the reaction region 38 on the plate 32, and are heated by the heater 36. The heat flux from the heater 36 is efficiently transferred into the interior of the reactor tube 37 due to a radiation heat transfer between the ceramic granules. The ceramic granules 33 are fluidized by the gas flow through the dispartion plate 32 to form a fluidized bed in the reaction region 38, and as a result, the ceramic granules 33 efficiently heat the bed gases to promote the descomposition of the hydrocarbon and transition metal compounds and growth of the carbon fibers from growth nuclei of the transition metal fine particles, respectively, and the moving ceramic granules 33 prevent an intermingling of the growing carbon fibers. The formed vapor growth carbon fibers 34 are carried upward by the gas flow, are separated from fine ceramic granules at the sedimentation region 35, and then are taken out of the reactor body 30.

The vapor growth carbon fibers and gases from the reactor 30 are cooled in a cooler 40 and then separated in a collector 50 by a filter 51, into the fibers and the gases. The gases flow out through a pipe 54, and the collected fibers are taken out by a discharger 52 and are carried by a transporting device 53 to a next process step.

Figure 2:
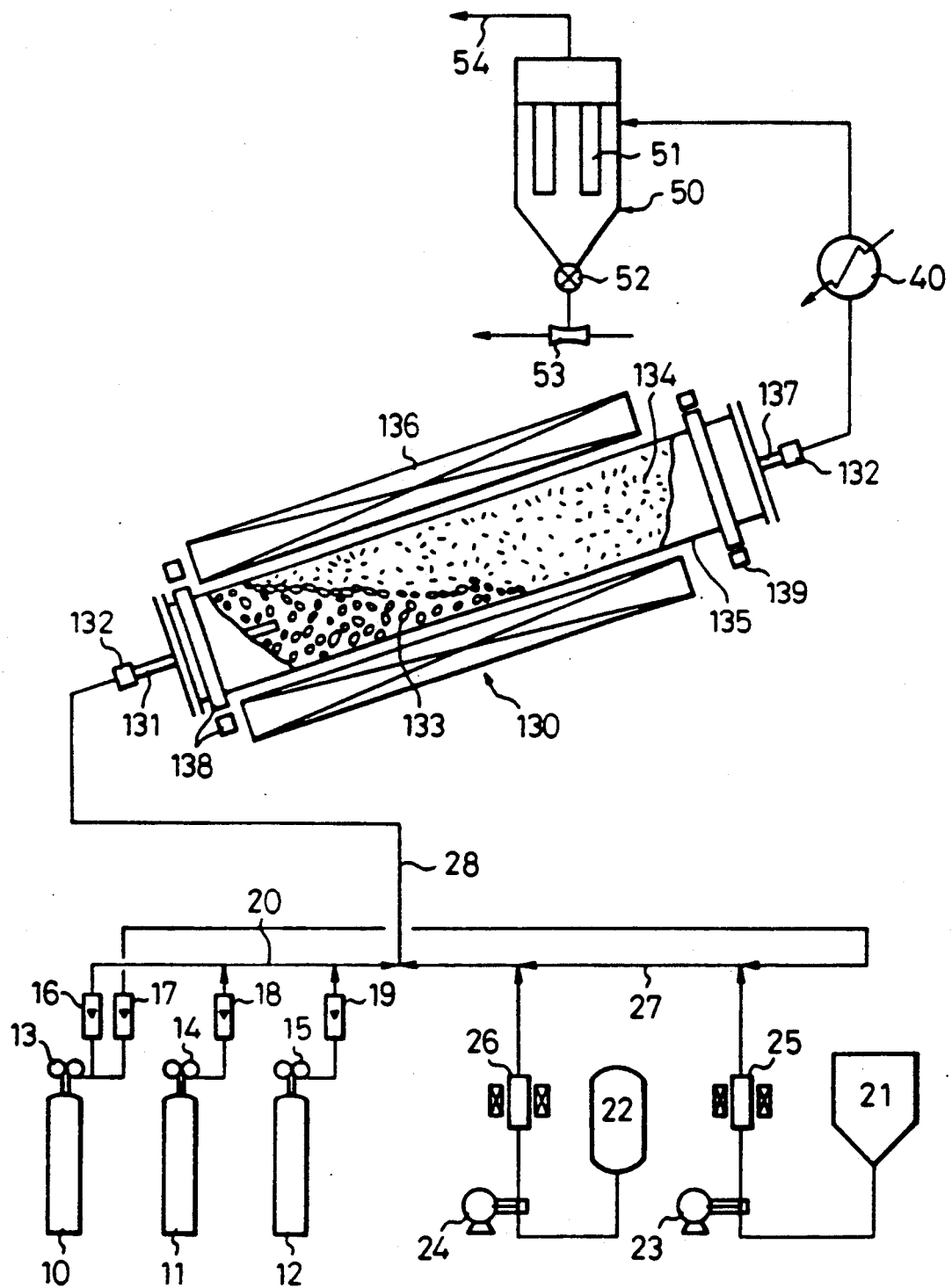
FIG. 2 is a schematic view of another apparatus for producing vapor growth carbon fibers, including a rotary kiln type reactor.

Referring to FIG. 2, another apparatus for producing vapor growth carbon fibers in accordance with the method of the present invention includes a rotary kiln type reactor 130. In this case, a system of feeding a carrier gas of hydrogen gas, a hydrogen sulfide gas, a carbon dioxide gas, a hydrocarbon, and a catalyst precursor is the same as that of the apparatus of FIG. 1. Namely, the hydrogen gas, the hydrogen sulfide gas and the carbon dioxide gas are fed from the cylinders 10, 11, and 12, respectively into the inlet pipe 28, and the gasificated hydrogen carbon and catalyst precursor are fed from the vessels 21 and 22 into the inlet pipe 28 through the vaporizers 25 and 26, respectively.

The rotary kiln type reactor 130 comprises a rotating reactor body 135, an inlet tube 131, an outlet tube 137, rotary joints 132 for the inlet and outlet tubes, a heating means (heater) 136, a device 138 for rotating the body 135, and a bearing 139. Ceramic granules 133 are charged into the reactor body 135, as shown in FIG. 2, and are heated by the heater 136. The heat flux from the heater 136 is efficiently transferred into the interior of the reactor body 135 due to the radiation heat transfer between the ceramic granules. The ceramic granules 133 are moved by a mechanical friction force from the inside surface of the rotating reaction body 135, and the force of gravity. As a result, the ceramic granules 133 efficiently heat the fed gases to promote the descomposition of the hydrocarbon and transition metal compounds and growth of the carbon fibers, and prevent intermingling of the growing carbon fibers. The formed carbon fibers 134 are carried by the gas flow, are separated from fine ceramic granules at the upper portion of the reactor body 135, and then are taken out of the reactor body 135.

The obtained vapor growth carbon fibers are cooled in a cooler 40 and then separated from the gases in a collector 50. The collected fibers are taken out by a discharger 52 and then carried by a transporting device 53 to a next process step. These devices 40, 50, 52 and 53 are the same as those in FIG. 1.

EXAMPLES 1 TO 3

The apparatus shown in FIG. 1 was used, and the hydrogen gas cylinder 10, the hydrogen disulfide gas cylinder 11, and the carbon dioxide gas cylinder 12 were prepared, and benzene and iron carbonyl were put into the vessels 21 and 22, respectively. The hydrogen, hydrogen disulfide, carbon dioxide, and benzene were fed at the flow rates thereof shown in Table 1 into the reactor 30 through the inlet pipe 28. The reactor body (tube) 37 was a mullite tube having a diameter of 200 mm. Ceramic granules of mullite granules having an average particle diameter of 500 $\mu$m were charged into the reactor mullite tube 37. The heating means 36 was an electric furnace, which was controlled to the heat mullite granules 33 in a uniform heating region at 1050° C. within a formed fluidized bed. Since the height of the fluidized bed depended on the total gas flow rate, the fluidized bed heights as shown in Table 1 were attained. Furthermore, the length of the uniform heating region depended on the total gas flow rate and the heating furnace length, so that the uniform heating region lengths as shown in Table 1 were attained. As can be seen from Table 1, as the fluidized bed height is increased, the uniform heating region length is increased. An average residence time of the flowing gas to a space volume between the granules in the fluidized bed was computed, and the obtained values are shown in Table 1.

Vapor growth carbon fibers were formed in the reactor 30, were carried by the gas flow, and were then collected in the collector 50. The collected fibers were not intermingled. Observation of the vapor growth carbon fibers by a scanning electron microscope (SEM) showed that the fibers contained very little soot-like materials, and the fibers had a relatively high uniform diameter and length. The average diameter and average length of 100 carbon fibers shown on a SEM photograph were measured to obtain the results shown in Table 1.

COMPARATIVE EXAMPLES 1 TO 3

The apparatus (FIG. 1) used in Examples 1 to 3 was used, but ceramic granules were not charged into the reactor mullite tube 37 (i.e., the reactor tube was empty). The electric furnace 36 was controlled to keep the uniform heating region of the reactor at 1050° C. and the gaseous materials used in Examples 1 to 3 were fed at flow rates shown in Table 1. The uniform heating region length depended on the Total gas flow rate, so that the lengths as shown in Table 1 were attained. The uniform heating region lengths (in the comparative examples 1 and 2) were far shorter than those attained when the ceramic granules were charged in the reactor tube. In comparative example 3, since the total flow rate was large, a temperature of the reaction space for growing carbon fibers was not increased to a predetermined temperature 1050° C.), and thus although a part of the formed vapor growth carbon fibers reached the collector 50, the greater part thereof remained in the reactor tube 37 as a flossy deposit, which had to be mechanically raked out. The product of the vapor growth carbon fibers was largely contaminated with soot-like material and had a uniform diameter and length thereof.

carbon fibers by a scanning electron microscope (SEM) showed that the fibers contained very little soot-like material and the fibers had a relatively high uniform diameter and length. The average diameter and average length of 100 carbon fibers shown on a SEM photograph were measured to obtain the results shown in Table 2.

TABLE 2

|  | EXAMPLES | |
| --- | --- | --- |
|  | 4 | 5 |
| Hydrogen Total Flow Rate (l/min) | 50 | 70 |
| Hydrogen Disulfide Flow Rate (l/min) | 0.07 | 0.1 |
| Carbon Dioxide Flow Rate (l/min) | 0.25 | 0.35 |
| Benzene Flow Rate (g/min) | 22.4 | 31.3 |
| Yield (%) | 63 | 58 |
| Length of Uniform Heating Temp. Region (mm) | 500 | 500 |
| Average Residence time (sec) | 1.55 | 1.11 |
| Average Diameter of VGCFs (μm) | 0.8 | 0.6 |
| Average Length of VGCFs (μm) | 150 | 130 |

*VGCF ... Vapor Growth Carbon Fiber

According to the present invention, a large and effective reaction space can be obtained for growing carbon fibers, without the need to control a convection heat transfer, by which a commercial production of vapor growth carbon fibers can be realized. The proposed reactors can attain controlled conditions, e.g., residence

TABLE 1

|  | EXAMPLES | | | COMPARATIVE EXAMPLES | | |
| --- | --- | --- | --- | --- | --- | --- |
|  | 1 | 2 | 3 | 1 | 2 | 3 |
| Hydrogen Total Flow Rate (l/min) | 70 | 100 | 150 | 70 | 100 | 150 |
| Hydrogen Disulfide Flow Rate (l/min) | 0.1 | 0.15 | 0.21 | 0.1 | 0.15 | 0.21 |
| Carbon Dioxide Flow Rate (l/min) | 0.35 | 0.5 | 0.75 | 0.35 | 0.5 | 0.75 |
| Benzene Flow Rate (g/min) | 31.3 | 44.3 | 66.5 | 31.3 | 44.3 | 66.5 |
| Yield (%) | 62 | 57 | 53 | 30 | 15 | 10 |
| Height of Fluidized Bed (mm) | 450 | 530 | 650 | — | — | — |
| Length of Uniform Heating Temp. Region (mm) | 400 | 480 | 600 | 300 | 200 | 0 |
| Average Residence Time (sec) | 1.22 | 1.16 | 1.10 | 1.7 | 0.8 | 0 |
| Average Diameter of VGCFs (μm) | 0.7 | 0.7 | 0.7 | 0.1–10 | 0.1–10 | 0.1–10 |
| Average Length of VGCFs (μm) | 200 | 160 | 100 | 5–100 | 5–100 | 5–100 |

*VGCF ... Vapor Growth Carbon Fiber

EXAMPLES 4 AND 5

The apparatus shown in FIG. 2 was used, and the hydrogen gas cylinder 10, the hydrogen disulfide gas cylinder 11 and the carbon dioxide gas cylinder 12 were prepared, and benzene and iron carbonyl were put into the vessels 21 and 22, respectively. The prepared gaseous materials were fed at flow rates shown in Table 2 into the reactor body 135. The reactor body 135 was a mullite tube having a diameter of 200 mm. Ceramic granules of mullite granules having an average particle diameter of 5 mm were charged into the reactor mullite tube 135 at a filler volume percentage of 20%. The heating means 136 was an electric furnace, which was controlled to heat mullite granules 133 in a uniform heating region at 1050° C. The reactor tube 135 was rotated at a rotary speed of 10 r.p.m. In this case, the length of the uniform heating region did not depend on the gas flow conditions, and thus was constant as shown in Table 2. An average residence time of the flowing gas to a space volume between the granules in the uniform heating region was computed, and the values obtained are shown in Table 2.

Vapor growth carbon fibers were formed in the reactor 130 were carried by the gas flow, and were then collected in the collector 50. The collected fibers were not intermingled. Observation of the vapor growth time and reaction temperature (uniform heating region temperature), so that the vapor growth carbon fibers having controlled form and structure can be produced at a high yield and at a low cost.

It will be obvious that the present invention is not restricted to the above-mentioned embodiments and that many variations are possible for persons skilled in the art without departing from the scope of the invention.

We claim:

1. A method of producing vapor growth carbon fibers which comprises growing carbon fibers in a reaction space of a reactor by thermally decomposing gaseous hydrocarbon and by using transition metal fine particles as a catalyst, wherein said reaction space is filled with ceramic granules which serve as a radiation heat transfer medium and are moved so as to form a fluidized bed, a moving bed, or a rotary bed to prevent an intermingling of growing carbon fibers, so that said vapor growth carbon fibers are conveyed from said reactor by a gas stream while the ceramic granules remain in said reactor.

2. A method according to claim 1, wherein said transition metal fine particles are formed by thermally decomposing an evaporating gas selected from the group consisting of transition metal compounds and organic transition metal compounds.

3. A method according to claim 1, wherein said ceramic granules are selected from the group consisting of mullite, alumina, and zirconia.

4. A method according to claim 1, wherein said ceramic granules are present in a rotary bed type reactor and have an average particle diameter of from 100 to 0.01 mm.

5. A method according to claim 1, wherein said ceramic granules are present in a fluidized bed type reactor and have an average particle diameter of from 10 to 0.01 mm.

6. A method according to claim 5, wherein said ceramic granules have an average particle diameter of from 5 to 0.05 mm.

7. A method according to claim 1, wherein said ceramic granules form a fluidized bed.

8. A method according to claim 1, wherein said ceramic granules form a moving bed.

9. A method according to claim 1, wherein said ceramic granules form a rotating bed by using a rotating reactor vessel.

* * * * *